United States Patent [19]

Philip

[11] 3,835,570

[45] Sept. 17, 1974

[54] MOTORIZED FISHING DEVICE

[76] Inventor: Charles R. Philip, Box 116, Haugen, Wis. 54841

[22] Filed: Jan. 26, 1973

[21] Appl. No.: 326,967

[52] U.S. Cl. ............................................. 43/19.2
[51] Int. Cl. .......................................... A01k 87/00
[58] Field of Search ............ 43/19.2, 26.1, 26.2, 20

[56] References Cited
UNITED STATES PATENTS

| 1,401,096 | 12/1921 | Neudeck | 43/19.2 |
| 2,187,849 | 1/1940 | Buddenbrock | 43/19.2 |
| 2,707,843 | 5/1955 | Howe | 43/26.1 |
| 2,746,198 | 5/1956 | Smith | 43/19.2 |
| 3,530,611 | 9/1970 | Britt | 43/20 |

Primary Examiner—Warner H. Camp
Attorney, Agent, or Firm—Wegner, Stellman, McCord, Wiles & Wood

[57] ABSTRACT

A motorized fishing device including a rod having line guides, a handle secured to the rod, a reel on the handle, a line secured to the reel and extending through the line guides on the rod, a drive motor mounted in the handle including a rotary drive shaft extending parallel to the rod, and an arm or finger having one end mounted coaxially with the shaft and an eccentric portion disposed to repeatedly strike an intermediate portion of the line on rotation of the drive shaft so that the free end of the line is rapidly jigged up and down.

14 Claims, 5 Drawing Figures

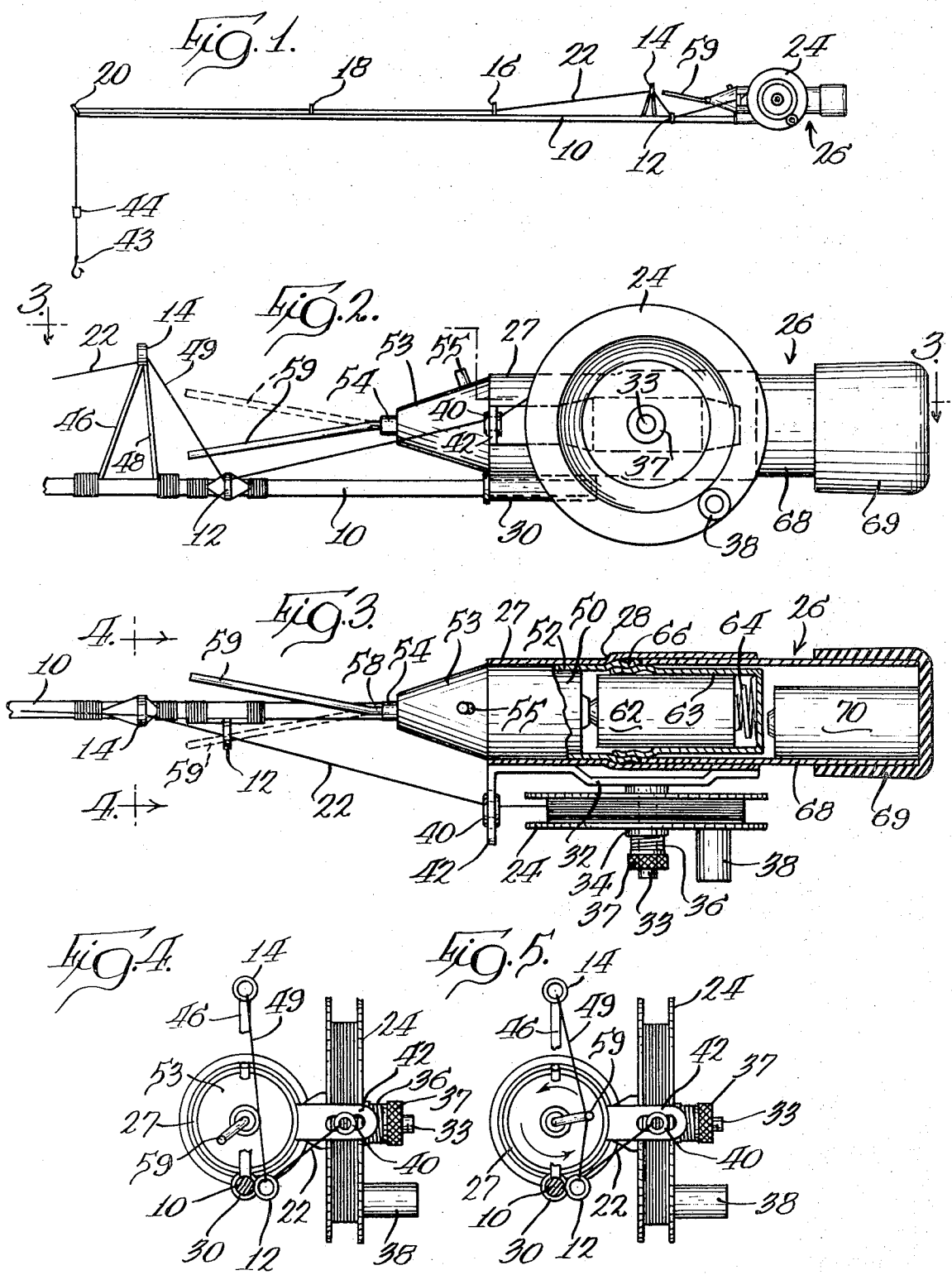

MOTORIZED FISHING DEVICE

BACKGROUND OF THE INVENTION

The present invention relates to a motorized fishing device which may be described as a jigging rod for rapidly moving a fish bait or lure at the end of a line hanging in water.

Throughout history, fishing has attracted many people, and it serves both as a means for providing food and a means for providing recreation. In order to increase catches, many efforts have been made to improve lures and to devise attractive lure movements which arouse the interest of fish within range of the fishermen. One method of fishing which has been called jigging involves movement of a lure or bait up and down in the water while remaining substantially in a single fishing location. Jigging has been a popular method of fishing through a hole in ice covering fishing water, since it is not practical under such circumstances to troll or cast and retrieve, though jigging is not limited to fishing in ice covered waters.

In the past, in order to move a hanging lure up and down in the water, various efforts have been directed toward provision of mechanized jigging devices. For example, U.S. Pat. Nos. 2,746,198 and 2,908,103 disclose jigging rods with a longitudinally reciprocating solenoid device attached to a jigging line for moving a lure back and forth. In such devices, the line is attached to a reciprocating member and is not freely adjustable to vary the length of line. U.S. Pat. No. 2,783,576 relates to a fishing rod with a spring motor driving a ratchet to oscillate an arm through which a line is threaded for jigging a lure. In such device, the line follows a rather tortuous course through an aperture in the jigging arm so that adjustment of the line is restricted and wear is likely. U.S. Pat. No. 3,600,837 shows a motor for driving a ratchet wheel to oscillate a jigging arm separate from a fishing rod. Such a construction does not conveniently incorporate the jigging device in the fishing rod. U.S. Pat. No. 3,085,361 discloses a lure containing an electric motor for driving a rotary shaft having a bent portion to flex the tail of the lure back and forth, but such a construction is not directed toward jigging.

It would be desirable to provide a motorized jigging device in which the power-operated mechanism is incorporated in the fishing rod and the line is relatively free and unrestricted for easy adjustment to vary the length of line from the handle and the reel to the lure.

SUMMARY OF THE INVENTION

It is a general object of the invention to provide a new and improved motorized jigging device including an elongate rod having a handle at one end and line guide means spaced along the rod between the handle and the free end of the rod, a drive motor mounted on the handle including a rotary drive shaft, and an arm driven by the shaft for repeatedly striking a portion of line extending through the guide means so that the free end of the line with a lure is rapidly jigged up and down.

Another object of the invention is to provide a new and improved jigging device of the type described including a line storage reel rotatably mounted on the handle and adjustable to vary the length of extended line without interference from the motorized arm.

A further object is to provide a new and improved jigging device of the type described in which the line guide means on the rod includes an eyelet positioned at one side of the rod and an adjacent eyelet positioned well above the rod for holding a stretch of line in a direction inclined relative to the length of the rod.

A more specific object is to provide a new and improved jigging device of the type described in which the handle is hollow, and the drive motor is mounted in the handle together with battery means for supplying power to the motor.

In the preferred construction illustrated, the drive motor includes a drive shaft extending longitudinally in a direction parallel to the rod and the arm for jigging the line includes one end mounted coaxially on the drive shaft for rotation therewith, to rapidly strike the line on rotation of the drive shaft.

BRIEF DESCRIPTION OF THE DRAWINGS

FIG. 1 is a side elevational view of a motorized jigging device embodying the principles of the present invention;

FIG. 2 is a fragmentary enlarged side elevational view of the device illustrated in FIG. 1;

FIG. 3 is a top plan view of the structure illustrated in FIG. 2, partly broken away to show the interior of the handle;

FIG. 4 is a transverse cross-sectional view taken at about the line 4—4 of FIG. 3; and FIG. 5 is a cross-sectional view similar to FIG. 4, with the drive shaft and striker arm angularly displaced from the position illustrated in FIG. 4.

DETAILED DESCRIPTION OF PREFERRED EMBODIMENT

Referring now to the drawings in more detail, a motorized jigging device embodying the principles of the present invention includes an elongated rod 10 usually made of flexible material such as plastic, metal or wood so that the rod is resiliently flexible, particularly when a fish is hooked. The rod 10 includes appropriate line guide means in the form of ferrules or eyelets 12, 14, 16, 18 and 20 spaced along the rod for guiding a line 22 along the rod from a storage reel 24 to the line guide 20 at the free end of the rod.

In order to facilitate manipulation of the rod 10, the butt end of the rod is secured to a handle structure 26. As best seen in FIGS. 2 and 3, the handle structure 26 includes an outer tubular member 27 having a reduced diameter at the front end, an enlarged diameter at the rear end, and a shoulder 28 between the reduced portion and the enlarged portion. As seen in FIG. 2, at the bottom of the tubular member 27, at the front end thereof, a tubular seat 30 is welded or otherwise appropriately secured to the member 27 to form a receiver for the butt end of the rod 10.

As best seen in FIG. 3, at one side of the tubular handle member 27, a bracket 32 is attached to the member 27 for supporting the reel 24. As illustrated, the bracket 32 includes a laterally directed stud 33, and the reel 24 includes a central hub portion rotatably mounted on the stud 33 and adapted to be held in adjusted positions by means of friction washers 34 on the stud 33 at opposite sides of the reel 24. On the outer end of the stud 33, a spring 36 acts against friction washer 34 and reacts against a threadably adjustable spring seat 37. In order to appropriately support a substantial length of line, the reel 24 is in the form of a spool with a central reduced portion with enlarged flanges at opposite ends, one of which carries a manually accessible knob 38 for rotatably adjusting the reel to vary the length of line extended from the end of the rod 10.

The line 22 has one end secured to the reel 24, and a substantial length of line may be wrapped on the reel 24. The free end of the line is led from the reel 24 through an eyelet or ferrule 40 which is laterally slidable in a flange 42 extending laterally outwardly from the mounting bracket 32. From the ferrule 40, the line is led to the eyelet or ferrule 12, and from the latter to the eyelet or ferrule 14. From the eyelet 14, the line is passed through the guides 16, 18 and 20, and the free end hangs from the free end of the rod 10 in order to support appropriate fishing aids, such as hooks, lures, bait, weight, and floats. As illustrated, the line has a hook 43 at the end and a bobber or float 44 which may be adjusted along the line in order to hold the hook at a predetermined level beneath the surface of the water.

In order to provide an intermediate stretch of line spaced from the rod 10 and accessible for manipulation to jig the lure or bait, the line 22 passes from the ferrule 40 to the side mounted guide 12 and then to guide 14 which is located substantially above the rod 10, as best seen in FIGS. 1 and 2. Whereas the guide 12 is located closely adjacent to the rod 10, as are the guides 16, 18 and 20, the eyelet 14 is mounted on upstanding legs 46 and 48 having lower ends secured to the rod 10 and upper ends to support the guide 14. The arrangement described provides for an intermediate stretch of line as at 49 extending in a direction transverse or inclined relative to the rod 10 and adequately spaced from the rod 10 so as to be accessible for manipulation to jig the bait or lure.

In order to provide for movement of the lure, an electric motor 50 is mounted in a tubular housing member 52 positioned in the hollow handle member 27. The housing 52 includes a tapered front end portion 53 rotatably supporting a drive shaft 54 driven by the motor 50 under control of a motor switch button 55. As illustrated herein, the drive shaft 54 is hollow and supports a finger or arm including an end portion 58 mounted coaxially in the drive shaft 54 and an angularly disposed end portion 59 which is eccentric relative to the shaft 54 and which is disposed to strike the stretch of line 49 extending between the guide ferrules 12 and 14.

The motor 50 is supplied with power by means of a dry cell storage battery illustrated at 62. The battery is positioned in a tubular housing 63 closed at the rear end and carrying a coiled spring 64 adapted to urge the battery 62 toward the motor 50. The front end of the housing member 63 is open, and the rear end of the housing member 52 is open, and the adjacent ends of the two housing members are formed with appropriate spiral deformations which enable a threadable connection between the two housing members as illustrated at 66. The enlargement of the housing member 52 at 66 forms an annular shoulder adapted to abut the annular shoulder 28 in the tubular handle member 27. The motor housing 52 and the battery housing 63 are enclosed in assembled relationship as illustrated by means of a tubular handle extension 68 which is tightly fitted in the handle member 27 and abuts the end of the motor housing member 52. The rear end of the handle extension 68 is closed by a resilient cup member 69 of material such as rubber or the like. If desired, a spare battery may be stored in the handle extension 68, as illustrated at 70.

In operation, the motor 50 is supplied with power by the battery 62. In a preferred construction, the battery 62 is a C size commercially available dry cell battery. Energization of the motor 50 is controlled by the push button switch 55, so that as long as the button 55 is held depressed, the motor 50 operates to rotate the drive shaft 54. As the shaft 54 rotates, the angularly disposed end portion 59 of the striker repeatedly engages and disengages the stretch of line 49. As seen in FIG. 4, the striker 59 is angularly disposed in a position out of contact with the line, whereas in 54, the striker 59 is angularly disposed in a position where the stretch of line 49 is deflected from a straight line extending between the guides 12 and 14. The deflection of the line as illustrated in FIG. 5 serves to pull the end of the line at 43 in FIG. 1 upwardly. Then, when the striker disengages the line at 49, the lure drops again to the original position.

The jigging device described herein is particularly useful for ice fishing, where it is not possible to troll, and where it is not convenient to cast a lure and then retrieve it. In ice fishing, a hole is cut in the ice adequately large to permit the bait or lure at the end of line 22 to be dropped through the hole down into the water. Under such circumstances, it is conventional to lower the lure to a position slightly elevated above the bottom, and set the bobber 44 appropriately to hold the bait at the desired depth. When the motor 50 is operated, the striker arm 59 provides a very fine movement of the bait rapidly upwardly and downwardly. At the same time, the bait also usually assumes a twisting movement back and forth in a half-circular path. With the motor 50 operating, and the striker arm 59 repeatedly brushing the line at 49, one effective method of fishing contemplates that the fisherman will raise the rod tip slowly upwardly for a distance of about one foot, and then very slowly down until the bobber again touches the water, whereupon the switch is released. The motion described apparently attracts fish in the vicinity, and when the switch is released, a strike often occurs, though strikes also occur when the bait is in motion.

I claim:
1. A fishing device, comprising,
   a. an elongate rod having a handle at one end and line guide means spaced therealong between the handle and the free end of the rod,
   b. a line having one end secured on the handle, an intermediate portion extending through the guide means, and a free end hanging from the free end of the rod,
   c. said guide means including spaced eyelets on the rod holding a stretch of line between two eyelets spaced from the rod,
   d. a drive motor mounted on the handle including a rotary drive shaft spaced laterally of the rod, and
   e. an arm driven by said rotary shaft for rotatively moving an end portion of the arm through an arcuate path which will intersect said stretch of line, each rotation of said arm causing said end portion to strike and deflect said stretch of line and thereby cause movement of said free end of the line.

2. A fishing device as defined in claim 1, including a reel rotatably mounted on the handle and having one end of the line secured thereto so that the length of line to the free end may be varied.

3. A fishing device as defined in claim 1, wherein said two eyelets are positioned on said rod so that said stretch extends in a direction transverse to the length of the rod.

4. A fishing device as defined in claim 1, wherein said motor is mounted in the handle and the drive shaft extends longitudinally in a direction parallel to the rod.

5. A fishing device as defined in claim 1, wherein said arm has one end mounted coaxially on the drive shaft and an angularly bent portion positioned to bump said stretch of line.

6. A fishing device as defined in claim 1, including battery means mounted on the handle for supplying power for the motor.

7. A fishing device, comprising,
   a. an elongate rod having a handle at one end and line guide means spaced therealong between the handle and the free end of the rod,
   b. a line having one end secured on one side of the handle, an intermediate portion extending through the guide means, and a free end hanging from the free end of the rod,
   c. said guide means including an eyelet positioned at said one side of the rod and an adjacent eyelet positioned well above the rod for holding a stretch of line extending therebetween in a direction inclined relative the length of the rod,
   d. a drive motor mounted on the handle including a rotary drive shaft, and
   e. an arm driven by the shaft and engageable with said stretch of line so that on rotation of the shaft the free end of the line is jigged up and down.

8. A fishing device as defined in claim 7, wherein said motor is mounted on said handle with the drive shaft extending longitudinally in a direction parallel to the rod, and said arm has one end mounted coaxially on the drive shaft and an angularly bent portion positioned to repeatedly engage and disengage said stretch of line.

9. A fishing device as defined in claim 7, wherein the handle is hollow and the drive motor is mounted in the handle, and including battery means in the handle for supplying power to the motor.

10. A fishing device as defined in claim 7, including a reel rotatably mounted at one side of the handle and having one end of the line secured thereto.

11. A fishing device, comprising,
   a. an elongate rod having line guide means spaced therealong including eyelets for holding a stretch of line between two eyelets spaced from the rod,
   b. a hollow handle secured to one end of the rod,
   c. a drive motor mounted in the handle including a rotary drive shaft spaced laterally of the rod and extending longitudinally in a direction parallel to the rod,
   d. an arm having one end mounted coaxially on the shaft for rotation therewith and an eccentric portion positioned to displace a stretch of line between said two eyelets on rotation of the drive shaft to cause movement of the free end of the line.

12. A fishing device as defined in claim 11, including battery means in the handle for supplying power to the motor.

13. A fishing device as defined in claim 11, including a reel rotatably mounted on one side of the handle, and a manually accessible knob on the reel for rotating the reel.

14. A fishing device, comprising,
   a. an elongate rod having line guide means spaced therealong,
   b. a hollow handle secured to one end of the rod,
   c. a reel rotatably mounted on one side of the handle,
   d. a line having one end secured to the reel, an intermediate portion extending through the guide means, and a free end hanging from the free end of the rod for supporting a fishing line,
   e. said guide means including spaced eyelets, one of said eyelets being mounted on said one side of the rod and the other of said eyelets being positioned above the rod, said eyelets holding a stretch of line extending in a direction inclined relative to the length of the rod,
   f. a drive motor mounted in the handle including a rotary drive shaft extending longitudinally in a direction parallel to the rod, and
   g. an arm having one end mounted coaxially on the shaft for rotation therewith and an eccentric portion disposed to repeatedly strike said stretch of line on rotation of the drive shaft so that the free end of the line is rapidly jigged up and down.

* * * * *